(12) United States Patent
Moran et al.

(10) Patent No.: US 11,715,112 B2
(45) Date of Patent: Aug. 1, 2023

(54) AUTOMATIC MESSAGE GENERATION AND PRESENTATION TO A COMMUNICATION NODE ENGAGED IN A COMMUNICATION

(71) Applicant: Avaya Inc., Santa Clara, CA (US)

(72) Inventors: Thomas Moran, Galway (IE); Gerard Carty, Kilcolgan (IE)

(73) Assignee: Avaya Inc., Santa Clara, CA (US)

( * ) Notice: Subject to any disclaimer, the term of this patent is extended or adjusted under 35 U.S.C. 154(b) by 929 days.

(21) Appl. No.: 16/546,514

(22) Filed: Aug. 21, 2019

(65) Prior Publication Data

US 2021/0056560 A1 Feb. 25, 2021

(51) Int. Cl.
| | |
|---|---|
| *G06Q 30/00* | (2023.01) |
| *H04L 12/26* | (2006.01) |
| *G10L 13/04* | (2013.01) |
| *G10L 15/26* | (2006.01) |
| *G10L 15/22* | (2006.01) |
| *G06Q 30/016* | (2023.01) |
| *H04L 43/08* | (2022.01) |
| *G10L 13/00* | (2006.01) |

(52) U.S. Cl.
CPC ............ *G06Q 30/016* (2013.01); *G10L 13/00* (2013.01); *G10L 15/22* (2013.01); *G10L 15/26* (2013.01); *H04L 43/08* (2013.01)

(58) Field of Classification Search
CPC ........ G06N 5/02; G06Q 30/016; G10L 13/00; G10L 13/043; G10L 15/22; G10L 15/265; H04L 12/26; H04L 43/08; H04L 51/02; H04L 67/565; H04M 3/51; H04M 3/523; H04M 3/533; H04M 3/53358; H04M 3/537; H04M 2201/40; H04M 2203/2038; H04M 2203/252

USPC .................. 379/265.06, 265.07; 705/304
See application file for complete search history.

(56) References Cited

U.S. PATENT DOCUMENTS 7,606,714 B2 * 10/2009 Williams .............. H04M 3/493
 704/275
8,634,543 B2    1/2014 Flockhart
 (Continued)

FOREIGN PATENT DOCUMENTS

| CN | 106357942 | 1/2017 |
| CN | 105786875 | 6/2019 |
| CN | 109922070 | 6/2019 |

OTHER PUBLICATIONS

Official Action with English Translation for China Patent Application No. 20201848505.9, dated Oct. 9, 2021 8 pages.
(Continued)

*Primary Examiner* — Harry S Hong
(74) *Attorney, Agent, or Firm* — Sheridan Ross P.C.

(57) ABSTRACT

Contact center agents commonly have dissimilar levels of skill for a particular topic or ability. Often an expert is available to help lesser-skilled agents, but such experts may not always be available. Automated systems and methods are provided that allow for an agent-customer interaction to be monitored and, when a question is present, identify a best-matching knowledge unit to address the question. With the knowledge unit identified, a prior communication portion associated with the knowledge unit is then presented to the agent, such as via pop-up message, whisper voice message, etc., to allow the agent to have the benefit of the knowledge of the expert to answer the question without engaging the expert.

20 Claims, 7 Drawing Sheets

(56) References Cited

U.S. PATENT DOCUMENTS

| | | |
|---|---|---|
| 8,818,926 B2 | 8/2014 | Wallace |
| 9,363,378 B1 | 6/2016 | McDaniel et al. |
| 9,961,204 B1 | 5/2018 | Moran et al. |
| 2010/0235218 A1 | 9/2010 | Erhart et al. |
| 2010/0296417 A1 | 11/2010 | Steiner |
| 2011/0125793 A1 | 5/2011 | Erhart et al. |
| 2011/0125826 A1 | 5/2011 | Erhart et al. |
| 2014/0119531 A1 | 5/2014 | Tuchman et al. |
| 2016/0247165 A1* | 8/2016 | Ryabchun ........... G06Q 30/0201 |
| 2020/0159827 A1* | 5/2020 | Vozila ................. G06F 40/289 |
| 2020/0311738 A1* | 10/2020 | Gupta ..................... G06F 16/22 |
| 2020/0311739 A1* | 10/2020 | Chopra ................ G06F 16/353 |
| | | 704/270.1 |

OTHER PUBLICATIONS

Official Action for India Patent Application No. 202014034826, dated Jun. 29, 2021 5 pages.

Official Action with English Translation for China Patent Application No. 20201848505.9, dated Apr. 25, 2021 17 pages.

Notification of Reexamination with English Translation for China Patent Application No. 202010848505.9, dated Aug. 23, 2022 12 pages.

Reexamination Decision with English Translation of p. 1 for China Patent Application No. 202010848505.9, dated Oct. 27, 2022 12 pages.

\* cited by examiner

| Keyword/Tag — 402 | Portion id. — 404 | |
|---|---|---|
| "open jaw" | #301 | 406A |
| International | #203 | 406B |
| Domestic | #003 | 406C |
| "Book flight" | #002 | 406D |
| Domestic/international mix | #309 | 406E |

| Content — 502 | Portion id. — 504 | |
|---|---|---|
| Flightbooking_301.MP3 | #301 | 506A |
| Flightbooking_203.txt | #203 | 506B |
| Flightbooking_003.MP4 | #003 | 506C |
| "To book a flight…" | #002 | 506D |
| Flightbooking_309.MP3 | #309 | 506E |

500

| Personality | Portion id. | File |
|---|---|---|
| Informal | #301 | /flights_301A.MP3 |
| Formal | #301 | /flights_301B.MP3 |
| Serious | #301 | /flights_301C.MP3 |
| Mature/older | #301 | /flights_301D.MP3 |
| Spontanious | #301 | /flights_301F.MP3 |

AUTOMATIC MESSAGE GENERATION AND PRESENTATION TO A COMMUNICATION NODE ENGAGED IN A COMMUNICATION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communications and particularly to the automatic generation and presentation relevant messages in real-time to a node engaged in a communication with a different node.

BACKGROUND

Contact centers often utilize human agents with varying degrees of skill for a number of different subject areas. Many contact centers have a limited number of Subject Matter Experts (SMEs) and cannot afford to deploy these limited resources onto all contacts with customers and for all subjects. Therefore, many contact centers will assign a contact to an agent that may not have the same experience level as an SME. In other words, there are times where a suboptimal agent/contact assignment is made based solely on agent availability. It is increasingly desirable to provide those agents with tools to enable a successful completion of the contact.

SUMMARY

Various types of artificially intelligent (AI) systems are being deployed in contact centers. For instance, chat bots and other automated systems are being used to initially respond to customer queries or provide self-help capabilities. If the customer is detected as getting stuck or frustrated with the automated tools, then the contact center tries to re-assign the customer to an appropriate agent. The problem is that the "appropriate agent" may be a currently available or soon to become available agent, but still not have the requisite skills or experience to support the customer's needs.

In one embodiment, a contact center artificial intelligence agent searches through recordings of prior customer-agent interactions to present a message and/or recorded segment to the agent in order to coach, prompt, or otherwise assist agents in their current customer interactions. The database of text and voice communications may have been processed and normalized using speech transcription and other analytical tools to provide additional definitions of recorded calls with attached agent ratings.

While an agent, utilizing an agent communication device, is engaged in a real-time interaction with a customer, utilizing a customer communication device, such as a voice call or text chat (e.g., simple messaging system (SMS), interactive chat, etc.) at least one processor executing instructions as an AI agent tracks the context of the call. The AI agent searches through the normalized database to locate historic interactions (e.g., voice calls, text, non-real time communications, etc.) having similar contextual tags, irrespective of current agent interaction style, associated with the highest agent skill ratings or highest rated successful outcome. These prior outcomes are then utilized to provide hints or responses to the current agent via a screen shot or pop or other cues. Where numerous historic interactions are identified as being relevant, AI can select the interaction(s) having similar interaction styles to that of the current agent to suggest a response to match the servicing agent's personality.

An historic interaction can be further automatically decomposed into smaller fragments, known herein as a "Knowledge Unit" (KU). Each KU constitutes a useful information subsection of the interaction that is rendered at a later stage to an agent via a screen shot or pop or other method. For example, within a 3-minute call, there may only be a useful 30-second section which captures a specific question and answer discussion regarding a specific issue or product enquiry. The system uses a variety of techniques to identify these specific KU's within the corpus of interactions, such as the speech analytics transcript and the associated agent computer activity (e.g., clicking on web links, documents accessed, etc.) or other consultation methods that the agent carries out to address that customer need. Using a combination of these techniques, the system automatically identifies a KU START and KU END points within an interaction, categorizes the KU and then maintains the KU in the historic archive. Detection of a question in a recorded call is variously embodied. One embodiment is described in U.S. Pat. No. 9,363,378 to McDaniel et al. and entitled, "Processing stored voice messages to identify non-semantic message characteristics," which is herein incorporated by reference for all that it teaches. In another embodiment, an agent may manually tag the portions of interactions that will potentially be useful in the future.

A KU may be embodied as a form of mini-tutorial that is derived from the automatic detection of a specific "useful information" section within an interaction. This can then be pushed to an agent later as full multimedia item (e.g., voice, screen display, video, speech transcripts, etc.) or just as text only, depending on receiving agent's preference, in real time during an active interaction.

In another embodiment, one or more KU's may be provided, or considered for presentation, to an agent as a means of assistance. The relevant KU(s) can be prioritized in many ways, for example as one or more of:

The outcome of the original call, that is KU's associated with calls having the best outcomes may be presented first, which may further be based on prior quality analysis of the original interaction;
 The Key Performance Indicator (KPI) or experience level of the agent who produced the KU;
 A match of the current agent personality/skill to the prior agent's personality/skill; and/or
 Length of the response.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed comprising: an agent communication device; a network interface; a data storage comprising a number of records of previously identified knowledge units; at least one processor comprising a memory, the at least one processor: monitors an interaction between the agent communication device and a customer communication device, via the network interface to a network; upon determining a question is present in the interaction, selects a knowledge unit from a plurality of knowledge units maintained in the data storage and wherein the selected knowledge unit comprises a best matching knowledge unit to one or more words of the question from the plurality of knowledge units; accesses a prior interaction portion associated with the selected knowledge unit; and causing the agent communication device to present the prior interaction portion.

In another embodiment, a method is disclosed for presenting real-time cues to an agent engaged in a real-time interaction over a network, comprising: monitoring the interaction between the agent communication device, utilized by the agent, and a customer communication device, utilized by a customer and wherein the agent communication device and the customer communication device conduct the interaction over the network; upon determining a question is present in the interaction, selecting a knowledge unit from a plurality of knowledge units maintained in a data storage and wherein the selected knowledge unit comprises a best matching knowledge unit to one or more words of the question from a plurality of knowledge units; accessing a prior interaction portion associated with the selected knowledge unit; and presenting the prior interaction portion to the agent.

In another embodiment, a system is disclosed comprising: means to monitor an interaction between an agent communication device, utilized by an agent, and a customer communication device, utilized by a customer and wherein the agent communication device and the customer communication device conduct the interaction over a network; means to, upon determining a question is present in the interaction, select a knowledge unit from a plurality of knowledge units maintained in a data storage and wherein the selected knowledge unit comprises a best matching knowledge unit to one or more words of the question from a plurality of knowledge units; means to access a prior interaction portion associated with the selected knowledge unit; and means to present the prior interaction portion to the agent.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 1.12(f) and/or Section 1.12, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
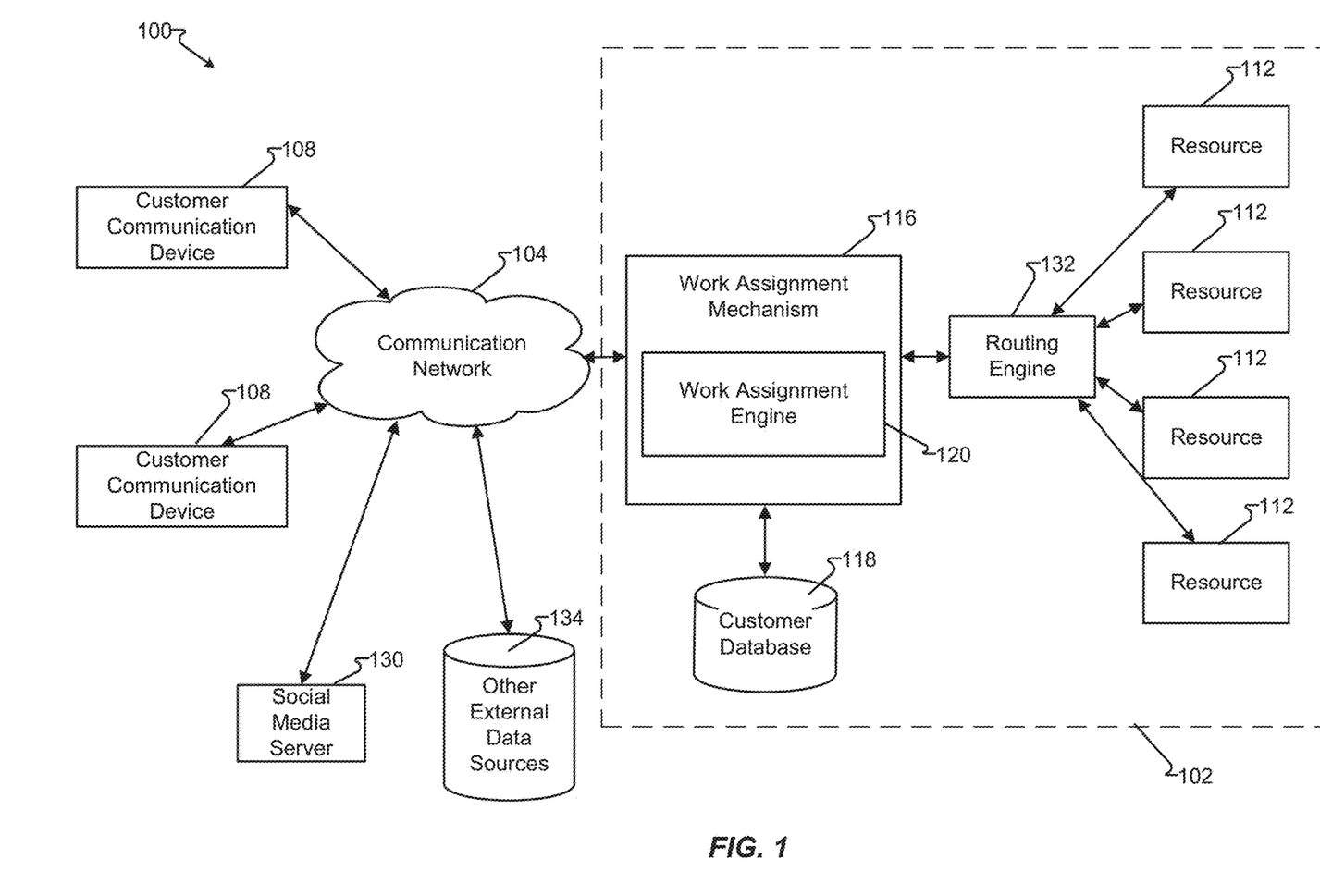
FIG. 1 depicts a first system in accordance with embodiments of the present disclosure.

With reference now to FIG. 1, communication system 100 is discussed in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering contact center 102 in which a plurality of resources 112 is distributed to handle incoming work items (in the form of contacts) from customer communication devices 108.

Contact center 102 is variously embodied to receive and/or send messages that are or are associated with work items and the processing and management (e.g., scheduling, assigning, routing, generating, accounting, receiving, monitoring, reviewing, etc.) of the work items by one or more resources 112. The work items are generally generated and/or received requests for a processing resource 112 embodied as, or a component of, an electronic and/or electromagnetically conveyed message. Contact center 102 may include more or fewer components than illustrated and/or provide more or fewer services than illustrated. The border indicating contact center 102 may be a physical boundary (e.g., a building, campus, etc.), legal boundary (e.g., company, enterprise, etc.), and/or logical boundary (e.g., resources 112 utilized to provide services to customers for a customer of contact center 102).

Furthermore, the border illustrating contact center 102 may be as-illustrated or, in other embodiments, include alterations and/or more and/or fewer components than illustrated. For example, in other embodiments, one or more of resources 112, customer database 118, and/or other component may connect to routing engine 132 via communication network 104, such as when such components connect via a public network (e.g., Internet). In another embodiment, communication network 104 may be a private utilization of, at least in part, a public network (e.g., VPN); a private network located, at least partially, within contact center 102; or a mixture of private and public networks that may be utilized to provide electronic communication of components described herein. Additionally, it should be appreciated that components illustrated as external, such as social media server 130 and/or other external data sources 134 may be within contact center 102 physically and/or logically, but still be considered external for other purposes. For example, contact center 102 may operate social media server 130 (e.g., a website operable to receive user messages from customers and/or resources 112) as one means to interact with customers via their customer communication device 108.

Customer communication devices 108 are embodied as external to contact center 102 as they are under the more direct control of their respective user or customer. However, embodiments may be provided whereby one or more customer communication devices 108 are physically and/or logically located within contact center 102 and are still considered external to contact center 102, such as when a customer utilizes customer communication device 108 at a kiosk and attaches to a private network of contact center 102 (e.g., WiFi connection to a kiosk, etc.), within or controlled by contact center 102.

It should be appreciated that the description of contact center 102 provides at least one embodiment whereby the following embodiments may be more readily understood without limiting such embodiments. Contact center 102 may be further altered, added to, and/or subtracted from without departing from the scope of any embodiment described herein and without limiting the scope of the embodiments or claims, except as expressly provided.

Additionally, contact center 102 may incorporate and/or utilize social media server 130 and/or other external data sources 134 may be utilized to provide one means for a resource 112 to receive and/or retrieve contacts and connect to a customer of a contact center 102. Other external data sources 134 may include data sources, such as service bureaus, third-party data providers (e.g., credit agencies, public and/or private records, etc.). Customers may utilize their respective customer communication device 108 to send/receive communications utilizing social media server 130.

In accordance with at least some embodiments of the present disclosure, the communication network 104 may comprise any type of known communication medium or collection of communication media and may use any type of protocols to transport electronic messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type and instead may be comprised of a number of different networks and/or network types. As one example, embodiments of the present disclosure may be utilized to increase the efficiency of a grid-based contact center 102. Examples of a grid-based contact center 102 are more fully described in U.S. Patent Publication No. 2010/0296417 to Steiner, the entire contents of which are hereby incorporated herein by reference. Moreover, the communication network 104 may comprise a number of different communication media, such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item. Illustrative work items include, but are not limited to, a contact directed toward and received at a contact center 102, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof. In some embodiments, the communication may not necessarily be directed at the work assignment mechanism 116, but rather may be on some other server in the communication network 104 where it is harvested by the work assignment mechanism 116, which generates a work item for the harvested communication, such as social media server 130. An example of such a harvested communication includes a social media communication that is harvested by the work assignment mechanism 116 from a social media network or server 130. Exemplary architectures for harvesting social media communications and generating work items based thereon are described in U.S. patent application Ser. Nos. 12/784,369, 12/706,942, and 12/707,277, filed Mar. 20, 2010, Feb. 17, 2010, and Feb. 17, 2010, respectively; each of which is hereby incorporated herein by reference in its entirety.

The format of the work item may depend upon the capabilities of the communication device 108 and the format of the communication. In particular, work items are logical representations within a contact center 102 of work to be performed in connection with servicing a communication received at contact center 102 (and, more specifically, the work assignment mechanism 116). The communication may be received and maintained at the work assignment mechanism 116, a switch or server connected to the work assignment mechanism 116, or the like, until a resource 112 is assigned to the work item representing that communication. At which point, the work assignment mechanism 116 passes the work item to a routing engine 132 to connect the communication device 108, which initiated the communication, with the assigned resource 112.

Although the routing engine 132 is depicted as being separate from the work assignment mechanism 116, the routing engine 132 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general, each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 132. The resources 112 can either be completely automated resources (e.g., Interactive Voice Response (IVR) units, microprocessors, servers, or the like), human resources utilizing communication devices (e.g., human agents utilizing a computer, telephone, laptop, etc.), or any other resource known to be used in contact center 102.

As discussed above, the work assignment mechanism 116 and resources 112 may be owned and operated by a common entity in a contact center 102 format. In some embodiments, the work assignment mechanism 116 may be administered by multiple enterprises, each of which has its own dedicated resources 112 connected to the work assignment mechanism 116.

In some embodiments, the work assignment mechanism 116 comprises a work assignment engine 120, which enables the work assignment mechanism 116 to make intelligent routing decisions for work items. In some embodiments, the work assignment engine 120 is configured to administer and make work assignment decisions in a queueless contact center 102, as is described in U.S. patent application Ser. No. 12/882,950, the entire contents of which are hereby incorporated herein by reference. In other embodiments, the work assignment engine 120 may be configured to execute work assignment decisions in a traditional queue-based (or skill-based) contact center 102.

The work assignment engine 120 and its various components may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users. Work assignment mechanism 116 may access customer database 118, such as to retrieve records, profiles, purchase history, previous work items, and/or other aspects of a customer known to contact center 102. Customer database 118 may be updated in response to a work item and/or input from resource 112 processing the work item.

It should be appreciated that one or more components of contact center 102 may be implemented in a cloud-based architecture in their entirety, or components thereof (e.g., hybrid), in addition to embodiments being entirely on-premises. In one embodiment, customer communication device 108 is connected to one of resources 112 via components entirely hosted by a cloud-based service provider, wherein processing and data storage elements may be dedicated to the operator of contact center 102 or shared or distributed amongst a plurality of service provider customers, one being contact center 102.

In one embodiment, a message is generated by customer communication device 108 and received, via communication network 104, at work assignment mechanism 116. The message received by a contact center 102, such as at the work assignment mechanism 116, is generally, and herein, referred to as a "contact." Routing engine 132 routes the contact to at least one of resources 112 for processing.

Figure 2:
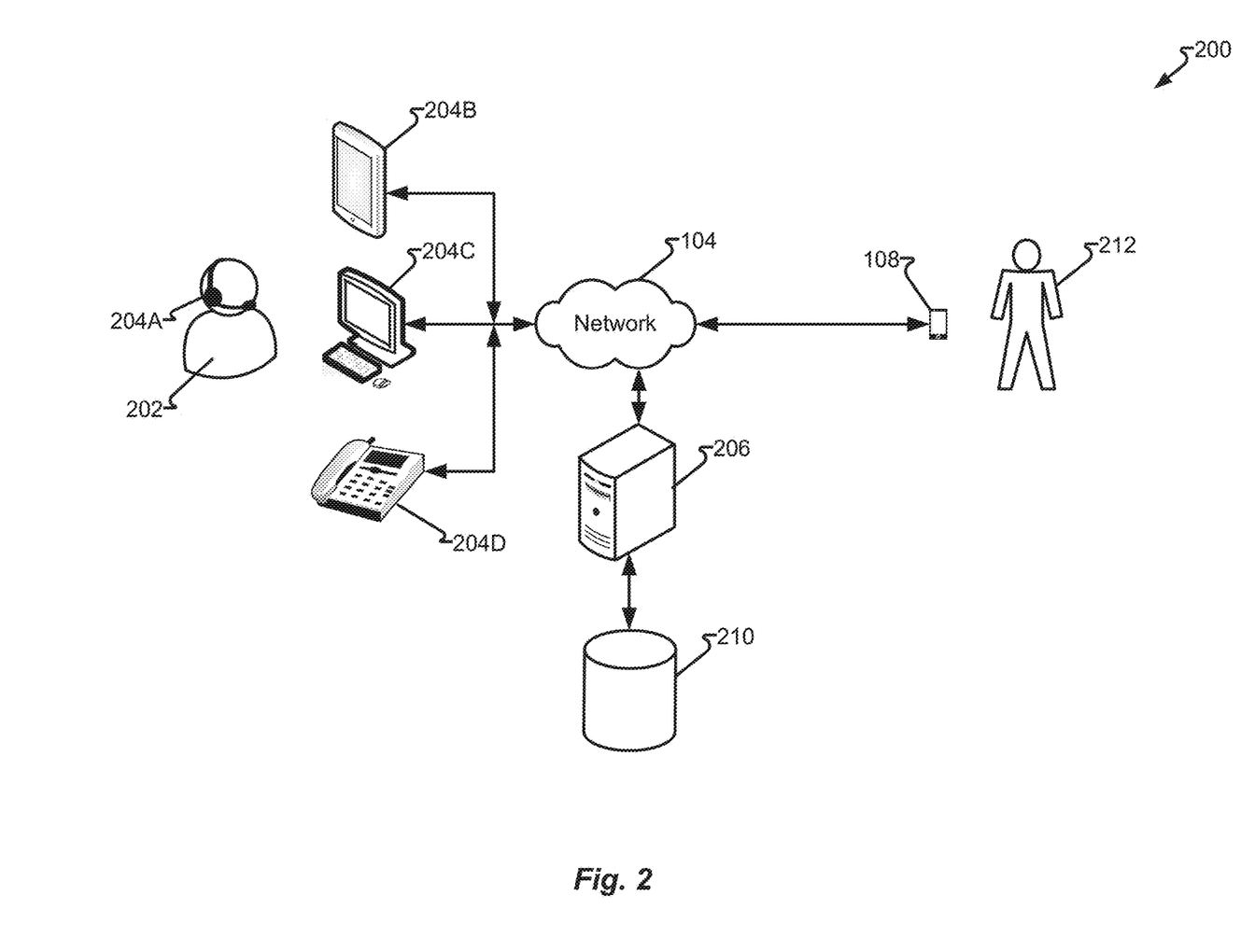
FIG. 2 depicts a second system in accordance with embodiments of the present disclosure.

FIG. 2 depicts system 200 in accordance with embodiments of the present disclosure. In one embodiment, system 200 illustrates a portion of system 100, whereby certain components are omitted to avoid unnecessarily complicating the figures and description. System 200 comprises agent 202 utilizing agent communication device 204 to send and receive content, including an interaction with customer 212 via customer communication device 108 over communication network 104 and/or content (e.g., knowledge units) from server 206. Agent communication device 204 may be embodied as a single device, such as agent communication device 204C which may be embodied as a computer or other device configured for omni-channel communications (e.g., text, voice, etc.). One or more agent communication devices 204 may work in a complementary manner, for example, agent communication device 204C may present knowledge units or other visual content while agent communication device 204D, embodied as a voice-only telephone, provides audio content alone or via an external device (e.g., agent communication device 204A embodied as an audio headset). Additionally or alternatively, agent communication device 204B, is embodied as a mobile or portable device, which may present knowledge units (and optionally other visual content), interaction content, or a combination thereof. As can be appreciated, the operation of agent communication device 204 as implemented by one or more devices is contemplated herein. In another embodiment, resource 112 is embodied by agent 202, being a human agent, utilizing at least one agent communication device 204.

In another embodiment, system 200 comprises server 206 and data storage 210, such as to monitor a real-time interaction between agent 202 and customer 212. The topology illustrated by system 200 is only one topology contemplated. For example, server 206 may be a node on communication network 104 and data storage 210 may be a different node. In another embodiment, one or more of server 206 and/or data storage 210 may be nodes on a first network, such as an internal network of which agent communication device 204 is also a node. In yet another embodiment, one or more of server 206 or data storage 210 may be co-implemented, in whole or in part, with agent communication device 204. Server 206 may comprise one or more physical devices with one or more microprocessors ("processor" or "processors") having, or having access to, a memory for the storage of instructions for execution by the processor(s).

In one embodiment, agent 202 and customer 212 are engaged in a real-time interaction, such as a voice communication. In another embodiment, agent 202 and customer 212 are engaged in a near real-time communication, such as a text chat wherein each anticipates a response within a pace of the interaction. For example, if a text chat initially takes twenty seconds for one participant (e.g., one of agent 202 or customer 212) to reply to the previous message from the other participant (e.g., the other of agent 202 or customer 212) then a longer wait, without announcing the longer wait, will likely cause the other participant to expect a response in the same roughly twenty seconds and, therefore, comprise a near real-time communication.

At least one processor of server 206 may monitor the interaction and upon determining that a question is present in the interaction. Accordingly, server 206 may be, comprise, or be comprised by work assignment mechanism 116, work assignment engine 120, routing engine 132, and/or switch, router, splitter, network edge device, etc. Upon detection of the question, server 206 accesses knowledge units (KU) maintained in a data storage, such as a memory and/or data repository which may include data storage 210. Upon server 206 determining a match between at least one KU and a keyword and/or tag of the question, a prior interaction portion associated with the KU is presented to agent 202, such as via agent communication device 204. It should be appreciated that the presentation of the KU may be on the same agent communication device 204 utilized for the communication, e.g., a "whisper" voice on agent communication device 204 providing voice interactions or a different device, such as agent communication device 204C to present textual and/or graphical information (e.g., screen-pop, text message, etc.) when the interaction with customer 212 is conducted as a voice communication.

In yet another embodiment, a particular KU may be rescored based on a provided or observed indicator or success. For example, if agent 202 correctly provides a particular KU that is believed to resolve an issue or answer a question, but does not, a relevancy score may be decreased so that a future utilization of the particular KU is reduced. Agent 202 may provide an indication of the success, such as by providing an input into a keyboard or other input device and/or at least one processor of server 206 or other computing device may monitor a response, such as from customer 212. If customer 212 says: "No, that didn't work," "That isn't what I meant." or other negative sentiment, the KU may be rescored to have a lessor relevancy to that particular question, keyword(s), or tag(s).

Figure 3:
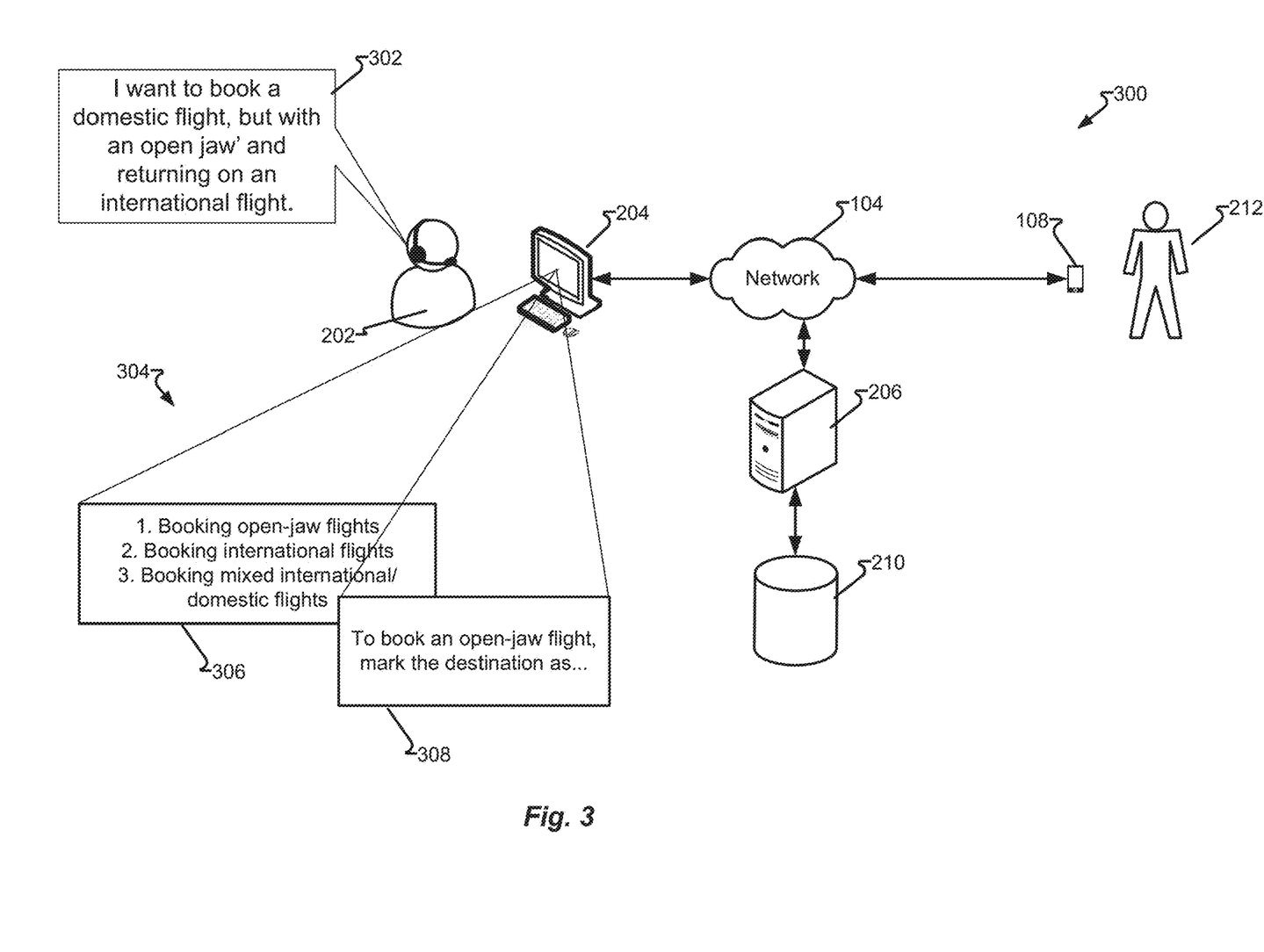
FIG. 3 depicts a third system in accordance with embodiments of the present disclosure.

FIG. 3 depicts system 300 in accordance with embodiments of the present disclosure. In one embodiment, agent 202 is engaged in a real-time interaction with customer 212. Server 206 detects question 302. It should be appreciated that while questions may be explicit sentences beginning with "why," "how," etc. and ending with a question mark, implicit questions are also contemplated herein, such as question 302 stating a desire to have an action performed and, therefore, may be considered to implicitly be a question, such as an unvocalized/unwritten "how can I . . . ?" or "can you perform . . . ?" structure.

Server 206 may parse question 302, such as to discard any word that is not a noun or verb, keyword matching, etc. Additionally or alternatively, agent 202 may provide a tag to server 206 (e.g., "open jaw," "booking," etc.). Server 206 then finds the best match to the keywords/tags with KUs maintained in data storage 210. Optionally, if the highest matching KU is below a previously determined match-threshold, server 206 may omit providing the KU to avoid distracting agent 202 with information known to have limited value to address or resolve question 302. In another embodiment, a plurality of KUs may be selected for presentation to agent 202. For example, presentation 304 may comprise KU list 306 associated with a plurality of KUs. A first, or next, KU may automatically be presented without human intervention, such as KU 308 associated with the first KU within KU list 306. The presentation of knowledge unit 308 is provided while the interaction is ongoing and preferably within a few seconds (e.g., five, ten) of question 302 being asked or presented to agent 202. Should server 206 determine that agent 202 is or has answered or resolved question 302, presentation of knowledge unit 308 may be omitted.

Figure 4:
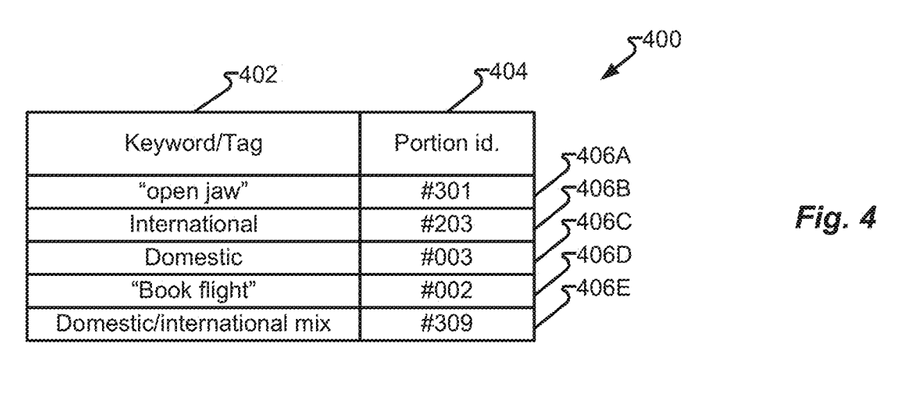
FIG. 4 depicts a first data structure in accordance with embodiments of the present disclosure.

FIG. 4 depicts data structure 400 in accordance with embodiments of the present disclosure. In one embodiment, data structure 400 comprises records 406 having keyword/tag field 402 and associated portion identification field 404. In one embodiment, server 206 accesses data structure 400, such as from data storage 210, upon determining that an ongoing interaction, such as question 302 comprises a question and obtaining or determining one or more keywords or tags, accessing data structure 400 and finding a matching, or best matching, one or more keyword/tag field 402 entries. Portion identification field 404 may comprise a reference to a KU (see, data structure 500 of FIG. 5) or the KU itself (e.g., audio content, textual content, etc.). Accordingly, the associated portion identification field 404 for a particular record 406 may be accessed by server 206 and provided to agent 202.

Figure 5:
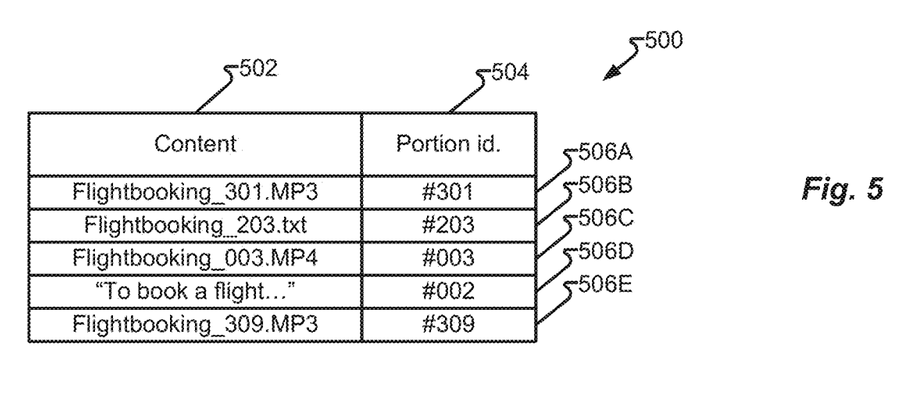
FIG. 5 depicts a second data structure in accordance with embodiments of the present disclosure.

FIG. 5 depicts data structure 500 in accordance with embodiments of the present disclosure. In one embodiment, data structure 500 comprises content field 502 and portion identifier 504 for a number of records 506. Server 206, knowing a particular KU to present to agent 202, such as by determining portion identifier 504 from one or more keywords (see, keyword/tag 402 of FIG. 4), then accesses content field 502 for a particular one or more matching records 506. In one embodiment, portion identification field 404 (see, FIG. 4) may be utilized as a key matching portion identifier 504 and, therefore, a particular record 506. Content field 502 may contain a sound file, video file, text file, document location, hyperlink, and/or an audio portion or text portion.

Figure 6:
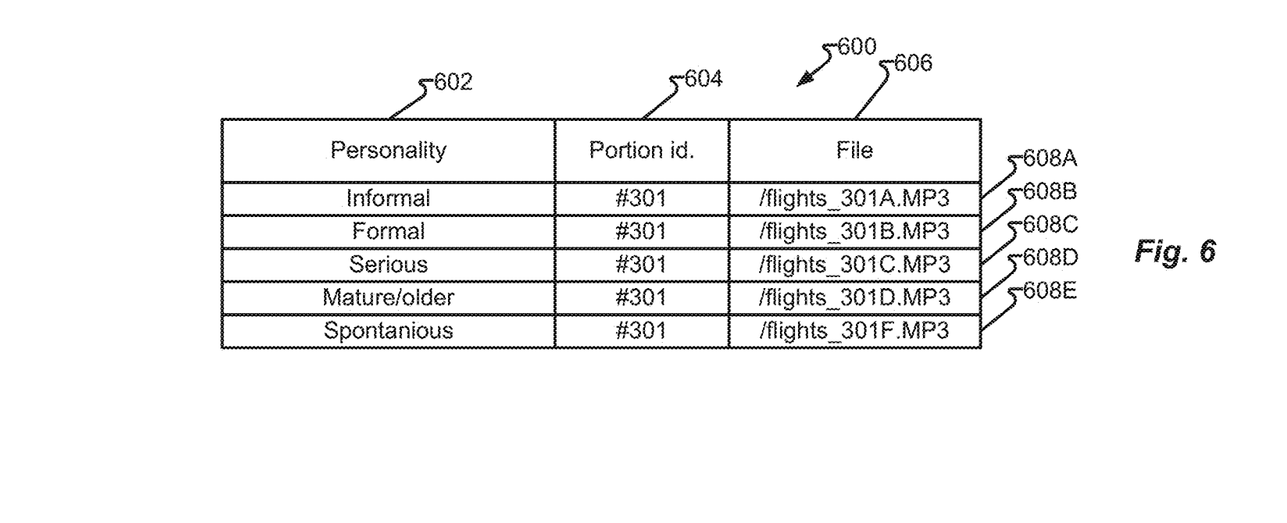
FIG. 6 depicts a third data structure in accordance with embodiments of the present disclosure.

FIG. 6 depicts data structure 600 in accordance with embodiments of the present disclosure. In one embodiment, data structure 600 comprises personality field 602, portion identifier field 604, and file identifier 606 for a number of records 608. If a number of KUs (e.g., a plurality of records 406/506) are determined to match a particular one or more keywords or tags within question 302, and are therefore determined to be beneficial to resolving question 302, then server 206 may prioritize the presentation of KUs. Prioritization may be variously embodied and include presenting the highest degree matching KU first or a KU that is most closely associated with agent 202. For example, data structure 600 may be accessed by server 206 and determine that a number of portion identifier field 604 match a particular question 302. Personality field 602 identifies an agent attribute associated with the prior interaction content that is associated with the KU. Accordingly, portion identifier field 604 may access a data structure (not shown) indicating an attribute of agent 202, such as "Formal" and when given the opportunity to select the same KU (e.g., portion identifier field 604) record 608 may be selected as matching personality field 602 and the associated prior interaction portion (e.g., "flights_301B.MP3" of record 308B) presented to agent 202. It should be appreciated that other attributes may be considered in addition or alternatively to personality field 602, such as language skill, knowledge of an indirectly related subject, etc.

Figure 7:
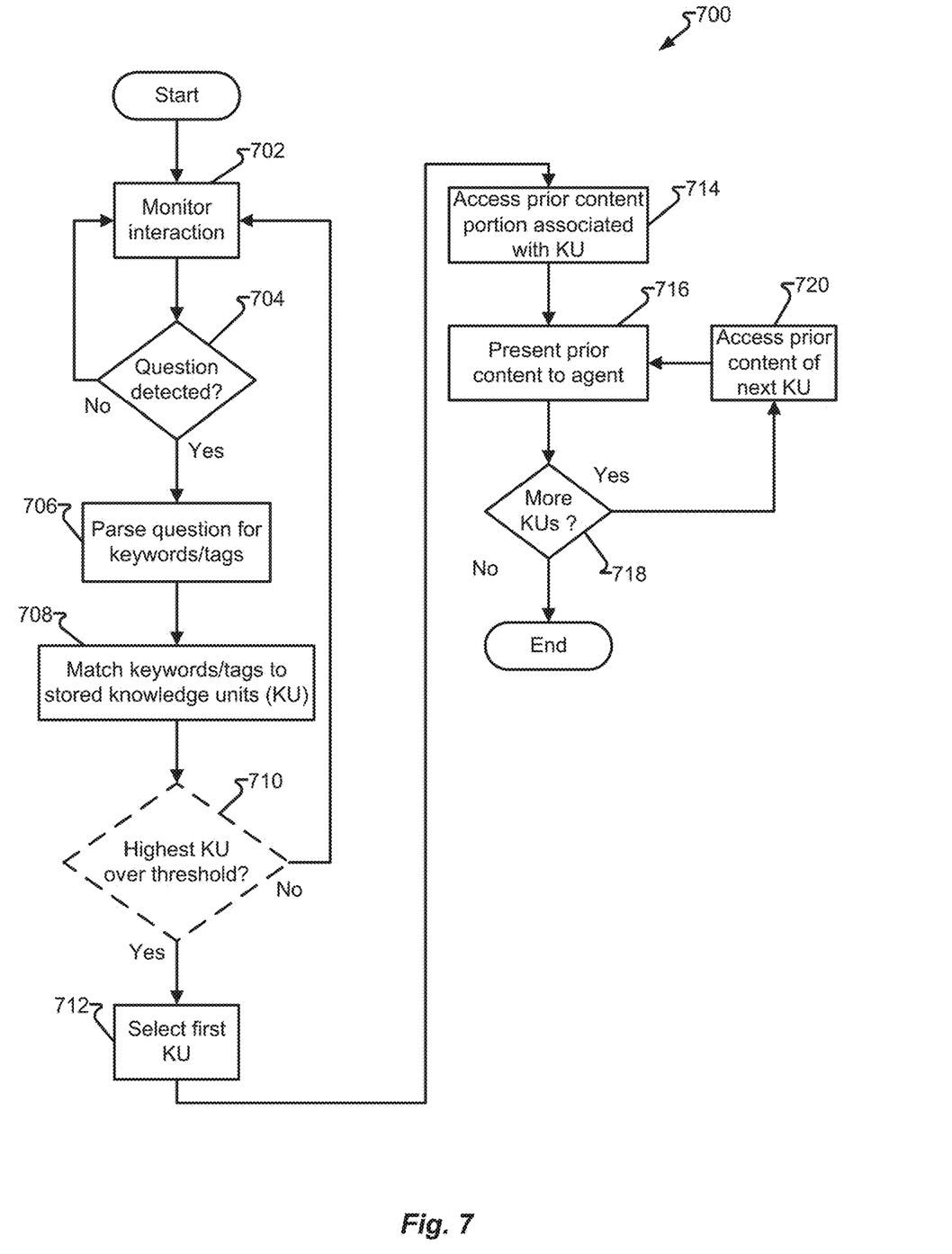
FIG. 7 depicts a process in accordance with embodiments of the present disclosure.

FIG. 7 depicts process 700 in accordance with embodiments of the present disclosure. In one embodiment, at least one processor, such as of server 206 executes process 700. Step 702 monitors an interaction, such as a real-time or near real-time interaction between agent 202 and customer 212. Test 704 determines if a question is detected and, if no, processing continues to loop back to step 702. If step 702 determines that a question is detected, processing may continue to step 706 whereby keywords or tags are determined or received, such as from agent 202. Step 708 then matches the keywords/tags to stored KUs.

Optionally, test 710 determines whether at least one KU is over a minimum matching threshold and, if not, processing may loop back to step 702 to continue monitoring the interaction. As a benefit, test 710 may avoid presenting the agent with KUs that are known to have limited value to resolve the question. If test 710 is omitted or, if included and determined in the affirmative, processing may continue to step 712 whereby a first KU is presented to the agent, such as via agent communication device 204.

Step 714 accesses a prior interaction portion associated with the KU, such as an audio file, video file, text, etc. of content field 502 of data structure 500. Next, step 716 presents the prior interaction content to the agent. Test 718 determines if there are more KUs, such as a plurality of KUs determined to address a particular question. If yes, processing continues to step 720 whereby the next KU is accessed and step 716 presents the associated next prior interaction portion to the agent. If test 718 is determined in the negative, process 700 may terminate or continue to monitor the interaction, such as to determine if a subsequent question is present in a subsequent iteration of step 702 and test 704.

Figure 8:
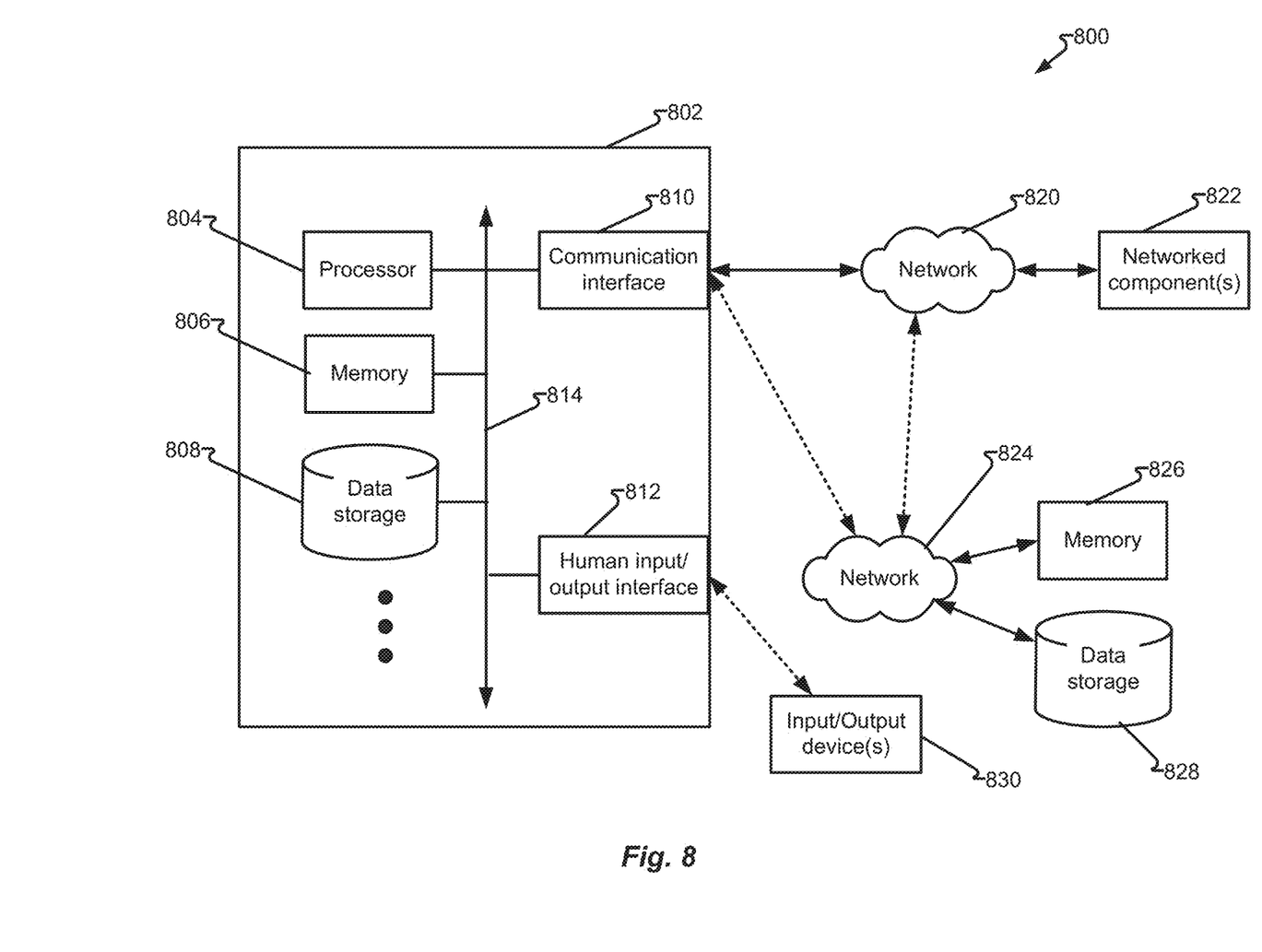
FIG. 8 depicts a fourth system in accordance with embodiments of the present disclosure.

FIG. 8 depicts device 802 in system 800 in accordance with embodiments of the present disclosure. In one embodiment, agent communication device 204 may be embodied, in whole or in part, as device 802 comprising various components and connections to other components and/or systems. The components are variously embodied and may comprise processor 804. Processor 804 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 814, executes instructions, and outputs data, again such as via bus 814.

In addition to the components of processor 804, device 802 may utilize memory 806 and/or data storage 808 for the storage of accessible data, such as instructions, values, etc. Communication interface 810 facilitates communication with components, such as processor 804 via bus 814 with components not accessible via bus 814. Additionally or alternatively, input/output interface 812 connects to one or more interface components to receive and/or present information (e.g., instructions, data, values, etc.) to and/or from a human and/or electronic device. Examples of input/output devices 830 that may be connected to input/output interface include, but are not limited to, keyboard, mouse, trackball, printers, displays, sensor, switch, relay, etc. In another embodiment, communication interface 810 may comprise, or be comprised by, input/output interface 812. Communication interface 810 may be configured to communicate directly with a networked component or utilize one or more networks, such as network 820 and/or network 824.

Network 104 may be embodied, in whole or in part, as network 820. Network 820 may be a wired network (e.g., Ethernet), wireless (e.g., WiFi, Bluetooth, cellular, etc.) network, or combination thereof and enable device 802 to communicate with network component(s) 822.

Additionally or alternatively, one or more other networks may be utilized. For example, network 824 may represent a second network, which may facilitate communication with components utilized by device 802. For example, network 824 may be an internal network to contact center 102 whereby components are trusted (or at least more so) that networked components 822, which may be connected to network 820 comprising a public network (e.g., Internet) that may not be as trusted. Components attached to network 824 may include memory 826, data storage 828, input/output device(s) 830, and/or other components that may be accessible to processor 804. For example, memory 826 and/or data storage 828 may supplement or supplant memory 806 and/or data storage 808 entirely or for a particular task or purpose. For example, memory 826 and/or data storage 828 may be an external data repository (e.g., server farm, array, "cloud," etc.) and allow device 802, and/or other devices, to access data thereon. Similarly, input/output device(s) 830 may be accessed by processor 804 via input/output interface 812 and/or via communication interface 810 either directly, via network 824, via network 820 alone (not shown), or via networks 824 and 820.

It should be appreciated that computer readable data may be sent, received, stored, processed, and presented by a variety of components. It should also be appreciated that components illustrated may control other components, whether illustrated herein or otherwise. For example, one input/output device 830 may be a router, switch, port, or other communication component such that a particular output of processor 804 enables (or disables) input/output device 830, which may be associated with network 820 and/or network 824, to allow (or disallow) communications between two or more nodes on network 820 and/or network 824. For example, a connection between one particular customer, using a particular customer communication device 108, may be enabled (or disabled) with a particular networked component 822 and/or particular resource 112, such as another agent communication device 204, server 206, etc. Similarly, one particular networked component 822 and/or resource 112 may be enabled (or disabled) from communicating with a particular other networked component 822 and/or resource 112, including, in certain embodiments, device 802 or vice versa. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
   an agent communication device;
   a network interface;
   a data storage comprising a number of records of previously identified knowledge units; and
   at least one processor comprising a memory, the at least one processor:
   monitors an interaction between the agent communication device and a customer communication device, via the network interface to a network;
   upon determining a question is present in the interaction, selects a knowledge unit from a plurality of knowledge units maintained in the data storage and wherein the selected knowledge unit comprises a best matching knowledge unit to one or more words of the question from the plurality of knowledge units;
   accesses, from the data storage, a prior interaction portion, that occurred before the interaction, during a past interaction comprising the selected knowledge unit; and
   cause the agent communication device to present the prior interaction portion.

2. The system of claim 1, wherein the at least one processor selects the selected knowledge unit from the plurality of knowledge units upon the at least one processor determining that the one or more words of the question comprise a best match to a tag associated with one of the plurality of selected knowledge units which is then selected as the selected knowledge unit.

3. The system of claim 1, wherein the at least one processor causes the agent communication device to present the prior interaction portion, recorded as voice, as text.

4. The system of claim 1, wherein the at least one processor causes the agent communication device to present the prior interaction portion, recorded as text, as voice.

5. The system of claim 1, wherein:
   the at least one processor, upon determining the question is present in the interaction, select at least two knowledge units from the plurality of knowledge units maintained in the data storage and wherein the selected at least two knowledge units each comprises best matching knowledge units to the one or more words of the question from the plurality of knowledge units;

the at least one processor access at least two prior interaction portions associated with the selected at least two knowledge units; and the at least one processor cause the agent communication device to present the at least two prior interaction portions.

6. The system of claim 5, wherein the best matching knowledge units comprise top matching knowledge units.

7. The system of claim 5, wherein the one processor cause the agent communication device to present the at least two prior interaction portions in priority order, wherein a better matching knowledge unit, of the at least two knowledge units, is presented more prominently than at least one other knowledge unit of the at least two knowledge units.

8. The system of claim 5, wherein the best matching knowledge units comprise the knowledge unit associated with a prior agent that provided the prior interaction portion, having an entry in the data storage indicating the prior agent is a better personality match to the agent.

9. The system of claim 1, wherein the at least one processor causes the agent communication device to present the prior interaction portion as an indicia of availability of the prior interaction portion, and not as the prior interaction portion, upon the at least one processor determining an agent is answering the question.

10. The system of claim 1, wherein the at least one processor causes the agent communication device to terminate presentation of the prior interaction portion upon the at least one processor determining an agent has answered the question.

11. The system of claim 1, wherein the agent communication device comprises a plurality of communication devices, each of the plurality of communication devices being connected to at least one of a plurality of networked components and wherein at least one of the networked components comprises the customer communication device.

12. A method for presenting real-time cues to an agent engaged in a real-time interaction over a network, comprising:

monitoring the real-time interaction between an agent communication device, utilized by the agent, and a customer communication device, utilized by a customer and wherein the agent communication device and the customer communication device conduct the real-time interaction over the network;

upon determining a question is present in the real-time interaction, selecting a knowledge unit from a plurality of knowledge units maintained in a data storage and wherein the selected knowledge unit comprises a best matching knowledge unit to one or more words of the question from the plurality of knowledge units;

accessing, from the data storage, a prior interaction portion, that occurred before the real-time interaction, during a past interaction comprising the selected knowledge unit; and presenting the prior interaction portion to the agent.

13. The method of claim 12, wherein a presentation of the prior interaction portion comprises converting the prior interaction portion from one of text into speech or speech into text.

14. The method of claim 12, further comprising:

upon determining the question is present in the real-time interaction, selecting at least two knowledge units from the plurality of knowledge units maintained in the data storage and wherein the selected at least two knowledge units each comprises best matching knowledge units to the one or more words of the question from the plurality of knowledge units;

accessing at least two prior interaction portions associated with the selected at least two knowledge units; and causing the agent communication device to present the at least two prior interaction portions.

15. The method of claim 14, wherein the best matching knowledge units comprise top matching knowledge units.

16. The method of claim 14, wherein the causing of the agent communication device to present the at least two prior interaction portions in priority order, further comprises causing the agent communication device to present a better matching knowledge unit, of the at least two knowledge units, more prominently than at least one other knowledge unit of the at least two knowledge units.

17. The method of claim 14, wherein the best matching knowledge units comprise the knowledge unit associated with a prior agent that provided the prior interaction portion, having an entry in the data storage indicating the prior agent is a better personality match to the agent.

18. The method of claim 12, further comprising causing the agent communication device to present the prior interaction portion as an indicia of availability of the prior interaction portion, and not as the prior interaction portion, upon determining the agent is answering the question.

19. The method of claim 12, further comprising causing the agent communication device to terminate presentation of the prior interaction portion upon determining the agent has answered the question.

20. A system comprising:

means to monitor an interaction between an agent communication device, utilized by an agent, and a customer communication device, utilized by a customer and wherein the agent communication device and the customer communication device conduct the interaction over a network;

means to, upon determining a question is present in the interaction, select a knowledge unit from a plurality of knowledge units maintained in a data storage and wherein the selected knowledge unit comprises a best matching knowledge unit to one or more words of the question from a plurality of knowledge units;

means to access, from the data storage, a prior interaction portion, that occurred before the interaction, during a past interaction comprising the selected knowledge unit; and means to present the prior interaction portion to the agent.

* * * * *

UNITED STATES PATENT AND TRADEMARK OFFICE
CERTIFICATE OF CORRECTION

| | |
|---|---|
| PATENT NO. | : 11,715,112 B2 |
| APPLICATION NO. | : 16/546514 |
| DATED | : August 1, 2023 |
| INVENTOR(S) | : Thomas Moran and Gerard Carty |

It is certified that error appears in the above-identified patent and that said Letters Patent is hereby corrected as shown below:

In the Claims

At Column 18, Line 48, please delete "cause" and insert --causes-- therein.

Signed and Sealed this
Twenty-first Day of November, 2023

Katherine Kelly Vidal
*Director of the United States Patent and Trademark Office*